US006735200B1

(12) United States Patent
Novaes

(10) Patent No.: US 6,735,200 B1
(45) Date of Patent: May 11, 2004

(54) METHOD AND APPARATUS FOR MONITORING THE AVAILABILITY OF NODES IN A COMMUNICATIONS NETWORK

(75) Inventor: Marcos N. Novaes, Hopewell Junction, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/532,834

(22) Filed: Mar. 21, 2000

(51) Int. Cl.[7] .............................................. H04L 12/28
(52) U.S. Cl. ....................................... 370/390; 370/432
(58) Field of Search .............................. 370/255, 252, 370/256, 254, 432, 400, 408, 351, 390, 389, 392

(56) References Cited

U.S. PATENT DOCUMENTS

| | | | | |
|---|---|---|---|---|
| 4,807,224 A | | 2/1989 | Naron et al. .................. 370/94 |
| 5,289,460 A | * | 2/1994 | Drake et al. ................. 370/245 |
| 5,355,371 A | | 10/1994 | Auerbach et al. ............. 370/60 |
| 5,361,256 A | | 11/1994 | Doeringer et al. ............ 370/60 |
| 5,634,011 A | | 5/1997 | Auerbach et al. ....... 395/200.15 |
| 5,671,222 A | | 9/1997 | Chen et al. .................. 370/388 |
| 5,778,187 A | | 7/1998 | Monteiro et al. ....... 395/200.61 |
| 5,790,522 A | | 8/1998 | Fichou et al. ................ 370/236 |
| 5,805,786 A | * | 9/1998 | Badovinatz et al. ............ 714/4 |
| 5,831,975 A | | 11/1998 | Chen et al. .................. 370/256 |
| 6,507,863 B2 | * | 1/2003 | Novaes ....................... 709/201 |

OTHER PUBLICATIONS

"A Scalable, Dynamic Multicast Routing Algorithm in ATM Networks", R. Venkateswaran et al., IEEE Infocom '98, pp. 1361–1365.
"VTDM—A Dynamic Multicast Routing Algorithm", H.C. Lin et al., IEEE Infocom '98, pp. 1426–1432.
"An Efficient Multicast Routing Algorithm for Delay–Sensitive Applications with Dynamic Membership", S.P. Hong et al., IEEE Infocom '98, pp. 1433–1440.
"Method for Improving Network Availability with Redundant Network Servers", IBM Technical Disclosure Bulletin, vol. 39, No. 8, Aug. 1996, pp. 195–196.
"Encoding of Multicast–Tree Routes", IBM Technical Disclosure Bulletin, vol. 37, No. 11, pp. 309–311.

* cited by examiner

*Primary Examiner*—Min Jung
*Assistant Examiner*—Andy Lee
(74) *Attorney, Agent, or Firm*—Lawrence D. Cutter; Jon A. Gibbons; Fleit, Kain, Gibbons, Gutman, Bongini & Bianco P.L.

(57) ABSTRACT

A method and apparatus for managing communications in a distributed computing system wherein a plurality of computers are interconnected with a communications network. At least a portion of the network is established as a subnetwork with at least one node attached to the subnetwork. The node in the subnetwork multicast a verification message over the subnetwork in which it is attached. A subnetwork leader for each subnetwork is identified and gathers the verification message sent from each node in the subnetwork. The subnetwork leader assembles each verification received into a subnetwork list. The subnetwork list is sent a node identified as the network leader. The network leader assembles each subnetwork list received into a master list and sends this master list out to the subnetwork leaders. In turn, the subnetwork leaders for each subnetwork multicast the master list out to each node.

In one embodiment, the communications between each subnetwork leader and the network leader is over multicast.

In another embodiment, a system and computer readable medium is disclosed to carry out the above method.

34 Claims, 12 Drawing Sheets

METHOD AND APPARATUS FOR MONITORING THE AVAILABILITY OF NODES IN A COMMUNICATIONS NETWORK

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

BACKGROUND OF THE INVENTION

1. Field of the Invention

This invention relates to fault tolerant digital communications systems, in general, and more specifically to fault tolerant packet transmission systems involved in the management of multicast communications. Also, this invention generally relates to the field of distributed computing, wherein a plurality of computer machines are interconnected within a communications network, and more specifically with fault tolerant distributed systems.

2. Description of the Related Art

The term multicast in this disclosure refers to the protocol specification defined by the Internet Engineering Task Force (IETF) in the Request for Comments (RFC) specification 1122. In the field of providing a reliable network for the transmission for multicast datagrams, the specification of the protocol is such that a multicast datagram that originated in one node is only propagated directly to other nodes which are connected to the same subnetwork of the node that originated the datagram. In order for a multicast datagram to be received in a node which is not directly connected in the same subnetwork of the node that originated the request, the multicast datagram needs to be "routed." The routing operation involves the deployment of a routing node, termed a "router"; or package switching node. The location of the package switching nodes, expressed as an Internet Protocol (IP) address, is included in the multicast datagrams.

Multicast is presently considered one of the most efficient protocol for network communications. The justification for this assertion is the fact that nodes which do not subscribe for a specific multicast group will not even receive messages sent to that group. This is a significant advantage over the broadcast, which makes all nodes receive a message, even if there is no subscriber. The receipt of extraneous messages in a node amounts to an unnecessary CPU overhead. However, with the efficiency of multicast, there are difficulties. To begin, multicast requires to be routed, so that a datagram can be forwarded to another subnetwork. Unfortunately, not all routers presently support multicast routing. Also, due to system administrators preferences, the availability of multicast routing can never be assumed. (routers may not be configured to route multicast, even if they support such routing).

One multicast routing method and system is disclosed in U.S. Pat. No. 5,361,256, entitled "Inter-Domain Multicast Routing," with inventors Doeringer et. al, issued Nov. 1, 1994 and assigned to International Business Machines for transmitting a message or data packet from a single sender to a plurality, i.e., a group of receivers, usually called multicasting, within a conventional unicast transmission network, i.e., a network basically not equipped to handed such multicast transmissions.

Another multicast method and system is disclosed in U.S. Pat. No. 5,778,187 entitled "Multicasting Method and Apparatus," with inventors Monteiro et al., issued Jul. 7, 1998 and assigned to Netcast Communications Corp. for a scalable architecture for delivery of real-time information over a communications network. Embedded into the architecture is a control mechanism that provides for the management and administration of user who are to receive real-time information.

Another multicast method and system is disclosed in U.S. Pat. No. 5,355,371 entitled "Multicast Communication Tree Creation and Control Method and Apparatus," with inventors Auerbach et al., issued Oct. 11, 1994 and assigned to International Business Machines for administration of the communication path making up the multicast tree in a communications network. The multicast tree itself has been separated form control and administration of the network.

Another multicast method and system is disclosed in U.S. Pat. No. 5,831,975 entitled "System and Method for Hierarchical Multicast Routing in Self-Routing in ATM Networks," with inventors Chen et al., issued Nov. 3, 1998 and assigned to Lucent Technologies for an extension of the PNNI protocols to support hierarchical multicast routing and signaling for ATM networks. The invention utilizes an extension to a core-based tree algorithm. Instead of a single core node, core nodes are maintained in each peer-group and each level of the hierarchy.

Another multicast method and system is disclosed in U.S. Pat. No. 5,671,222 entitled "Multicast Routing in Self-Routing Multistage Networks" with inventors Chen et al., issued Nov. 3, 1998 and assigned to Lucent Technologies for multicasting an inlet data cell, received as part of a multicast request, through a self-routing multicast request into one or more intermediate multicast requests, each intermediate multicast request being a unique subset of the original multicast request which enable a non-blocking, self-routing distribution to a subset of the desired outlet of the original multicast request which enables a non-blocking, self-routing distribution to a subset of the desired outlet of the original multicast request in one or two passes through the network, and by generating a non-blocking multicast tree based on the intermediate multicast requests and routing the received inlet data cell to the desire outlet.

Another multicast method and system is disclosed in U.S. Pat. No. 4,807,224entitled "Multicast Data Distribution System and Method," with inventors Naron et al., issued Feb. 21, 1989 for a data distribution system and method for the timely, efficient and reliable distribution of data to an unlimited number of remote receiver installations.

Another multicast method and system is disclosed in U.S. Pat. No. 5,790,522 entitled "Method and System for Performing Traffic Congestion Control In A Multicast Data Distribution System Network," with inventors Fichou et al., issued Aug. 4, 1998 for traffic congestion control is provided for a network node multiport switch capable of switching data packets of different priorities from input lines, via receive adapter, to output lines via transmit adapters.

In order to control the routing of the multicast datagrams, several algorithms exist, which will negotiate the ordering of the routing addresses in a multicast message. Such algorithms use the notion of "multicast trees." A multicast tree is determined by the way that the packets are routed through the routing nodes to reach specific destinations. In the case of a Wide Area Network (WAN), there are several ways of routing a datagram, since there are redundant links of routing nodes that form a communication path between any node to points in the WAN. The traditional multicast tree protocols are related to the task of finding an optimal path (of minimal cost) between any two destinations. A common problem that affects tree routing algorithms is that any of the routing nodes may fail due to hardware or software problems. In most cases the failure is not detected because there is no mechanism for monitoring the health of the routing nodes. Accordingly, a need exists to provide an efficient monitoring mechanism which informs every node in a network of the availability status of any other node in the network.

Another problem related to the routing of multicast messages is that traditionally most WAN do not support multicast communications. This can be especially problematic in a network topology where two or more LANs (Local Area Networks) are separated by a WAN. Accordingly, a need exists for a mechanism for routing multicast diagrams in a stand alone WAN or a WAN bridging two or more LANS.

Another problem related to the routing of multicast messages is that it becomes difficult to contain the spread of the routing of multicast messages. More specifically, it becomes very difficult to contain multicast traffic to only selected subnetworks, if they are attached to the same routing node. Also, as more routing nodes get added, subnetworks begin to receive duplicates of multicast datagrams. Accordingly, a need exists for a method and apparatus to keep communications to a minimum but at the same time leverage the benefits of multicast technology.

Still another problem related with multicast routing is that the shortest path optimization made by multicast tree algorithms may overload routing points which are connected to several nodes with an excess of datagram messages to forward. Typical multicast routing protocols do not take into account the balancing of the routing burden which is imposed to the routing nodes. Accordingly, a need for a method and apparatus to keep communication balanced between nodes while taking advantage of a multicast protocols.

Another aspect of the multicast technology is that not all hardware is capable of n routing multicast datagrams. In such cases, a technology which is called "tunneling" is deployed. Tunneling is a way in which multicast datagrams are encapsulated in regular IP packets which are then transmitted using regular TCP/IP, which is a point to point protocol. Using tunneling, nodes which reside in different subnetworks can send multicast datagrams to each other. In this case, one node in each subnetwork will act as an endpoint for a TCP/IP tunnel which will forward the multicast datagrams between the subnetworks.

The problem that arises in the deployment of tunnels is that typically the configuration of the tunnel is fixed. Typically, it is a task performed by the administrator of the communications network. In this case, a disruption of multicast links will happen if the hardware in any of the tunneling endpoints fails. A problem similar to the one faced by multicast tree algorithms arises when any of the tunneling endpoints fails, and the communication path or multicast datagrams is broken. And because the configuration of tunneling endpoints is a manual operation, the recovery of communications requires a manual intervention of the network administrator. Accordingly, a need exists to provide an efficient mechanism for monitoring the health of the tunneling endpoints and for acting on their failure by establishing alternative tunneling endpoints with which multicast datagrams may be routed between subnetworks.

The problem of detecting hardware failures in a communications network, or in a distributed computing system is very difficult to solve. The solutions for these problems typically demand a high amount of network traffic for sending hardware status verification messages, also called "heartbeats". Typical heartbeating solutions are not based on multicast protocols, since the failure of the routing points amounts to a disruption in multicast communications. However, the use of non-multicast protocols, cannot take advantage of the flexibility of the multicast messages, which reduce network traffic and such non-multicast algorithms demand too much bandwidth from the communications network. Accordingly, a need exists for a routing mechanism for datagram messages which limits the scope of propagation of routing protocol messages to a specific set of nodes in the communication network and which balances the routing operations for each routing point.

Still other problems that exist with management of current communications networks is the need to provide a simple program that can work across a variety of disperse, distinct and non-homogeneous network architectures with a small code foot print to work in small computers and routers, but that provides a correct hierarchal structure that is self contained and to enable the leveraging of multicast tunneling structure which is capable of dynamically routing the multicast messages to the entire communications network, independently of the network topology. Therefore, a need exists to overcome these and other problems.

SUMMARY OF THE INVENTION

A method and apparatus for managing communications in a distributed computing system wherein a plurality of computers are interconnected with a communications network. At least a portion of the network is established as a subnetwork with at least one node attached to the subnetwork. The node in the subnetwork multicast a verification message over the subnetwork in which it is attached. A subnetwork leader for each subnetwork is identified and gathers the verification message sent from each node in the subnetwork. The subnetwork leader assembles each verification received into a subnetwork list. The subnetwork list is sent a node identified as the network leader. The network leader assembles each subnetwork list received into a master list and sends this master list out to the subnetwork leaders. In turn, the subnetwork leaders for each subnetwork multicast the master list out to each node.

In one embodiment, the communications between each subnetwork leader and the network leader is over multicast.

In another embodiment, a system and computer readable medium is disclosed to carry out the above method.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF AN EMBODIMENT

Figure 1:
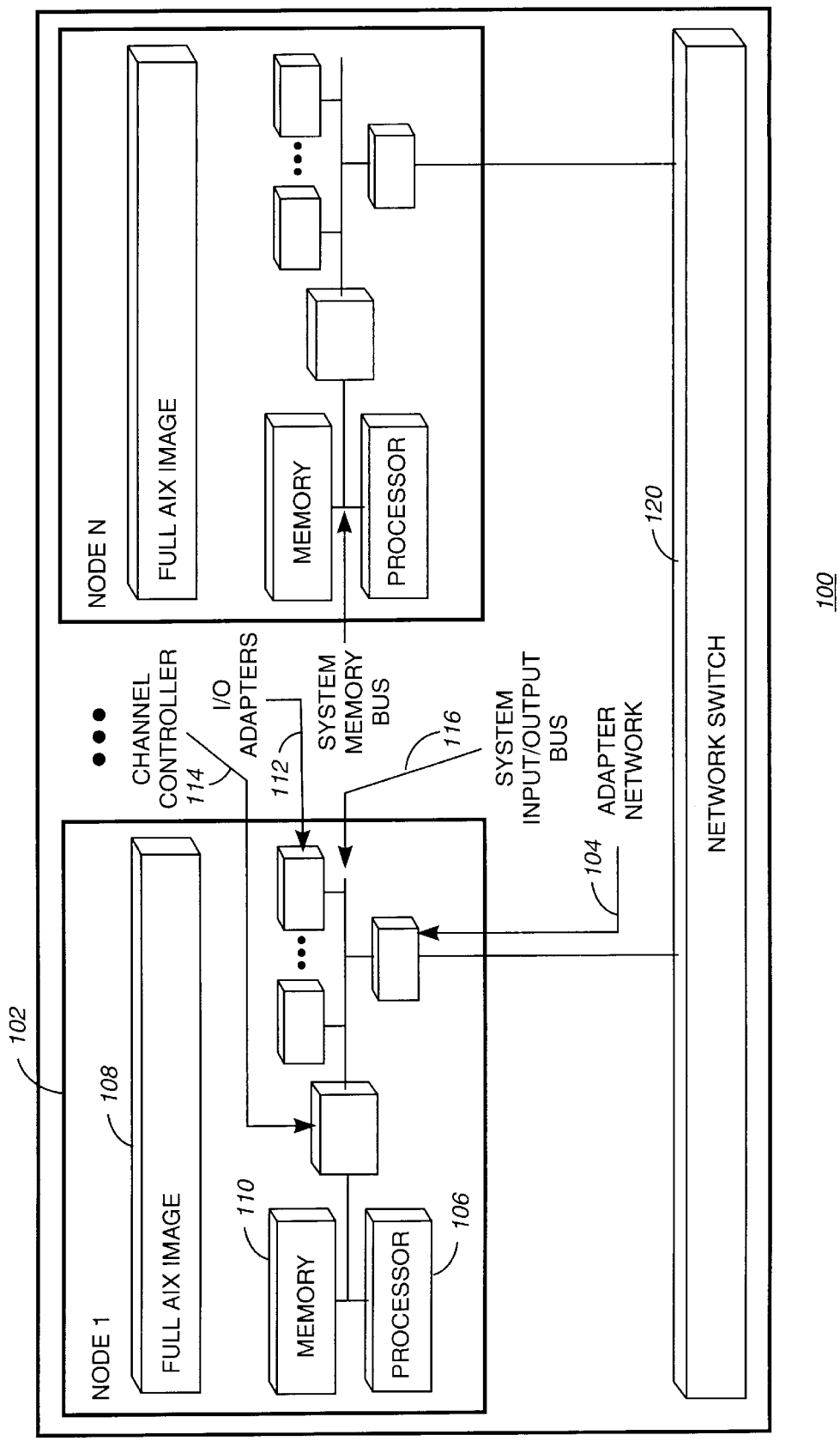
FIG. 1 depicts one example of a highly parallel distributed multiprocessor systems computing environment incorporating the principles of the present invention.

However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Glossary of Terms Used in This Disclosure

Beacon Node—a node in a communications network or parallel computer system that sends and receives messages via multicast over a subnetwork. The beacon node produces a periodic heartbeat message that is broadcast over a subnetwork.

Beacon Program—a program at a beacon node for sending beacon messages and receiving master lists of beacon heartbeat messages.

Channel—another name for a multicast group.

Configuration file—a file containing all the nodes in a subnetwork and their respective addresses and network address masks. For an exemplary configuration file refer to Table 1 below. Unlike the host address list, the configuration file does not contain the identification of the subnetwork leaders and the network leader, but rather a more static list of base IP addresses.

Computer Program—is any machine or man readable instruction capable of being executed on a node in a multi-node system. The computer program may be stored in any computer readable medium such as RAM, ROM or any removable computer medium such as a floppy diskette, CD, DVD, Flash or equivalent.

Datagram—a portion of a data packet.

Data packets—Digital information that is transmitted in such systems by dividing it into a number of packets, each packet having a header with all of the routing information necessary to control the switching nodes which the packet will encounter in its trip through the network from an originating node to a final destination or destinations.

Full connectivity—the ability to communicate with all operating nodes or functioning nodes in a network.

Gravitational center—a network topology where the weight of all possible routes to a the furthest destination nodes are equal or set as close to equal as possible for the given network topology.

Group—one or more nodes in a communication network configured to receive message, send messages or both with other nodes that are members of the group.

Heartbeat—the verifications messages sent in a communications network, or in adistributed computing system to determine operational status of hardware at one or more nodes.

Hop—the number of intermediate routing node it takes to reach the destination node from a source node.

Host Address List—a list of all the network address of the nodes in the network. The host address list includes a union of the master list and the subnetwork lists.

Master List—a list of heart beat messages sent by each subnetwork leader of each subnetwork and assembled by the network leader.

Multicast Group—a group of one or more nodes that subscribes to a certain set o of messages.

Network Leader—a node identified in a communications network to assemble the subnetwork lists of heart beat messages into a master list from beacon nodes sent from a subnetwork leader of each subnetwork. The network leader transmits the master list back out to each subnetwork leader or each subnetwork.

Reachability—the ability to reach nodes via multicast over an IP network at a level above the IP level with a datagram. Stated differently, the ability of a message that is sent to be received by one or more nodes. Example, "A" sends a message to all nodes in the network and it is received by all the nodes in the network, than "A" is said to have full reachability of all the nodes in the network.

Subnetwork—a logical distinct domain or grouping of nodes in a computer network. Typically one or more subnetworks comprise a computer network in an IP network or in a distributed parallel computing environment.

Subnetwork Leader—a node in a subnetwork that assembles the subnetwork list of beacon nodes from which it received a heartbeat message. In addition, the subnetwork leader transmits the master list it receives to each node on its subnetwork.

Subnetwork List—a list of one or more nodes in a subnetwork that sent a heart beat message that was received by the subnetwork leader.

Tunneling—is a process by which multicast datagrams are encapsulated in regular IP packets which are then transmitted using regular TCP/IP, which is a point to point-protocol. Using tunneling, nodes which reside in different subnetworks can send multicast datagrams to each other. In this case, one node in each subnetwork will act as an endpoint for a TCP/IP tunnel which will forward the multicast datagrams between the subnetworks.

Weight—the number of hops to reach a destination node from a given source node where the given source node has at least two paths to get to the destination node. The weight is said to be equal when all of the possible number of paths and the number of hops are equal fro a given source node.

Parallel Distributed Computing Environment

Referring now in more detail to the drawings in which like numerals refer to like parts throughout several views, FIG. 1 is a block diagram of a distributed computing environment 100 that includes a plurality of nodes 102 coupled to one another via a plurality of network adapters 104. Each node 102 is an independent computer with their own operating system image 108, memory 110 and processor(s) 106 on a system memory bus 118, a system input/output bus 116 couples I/O adapters 112 and network adapter 104. Each network adapter is linked together via a network switch 120.

In one example, distributed computing environment 100 includes N nodes 102 with one or more processors 106. In one instance, each processing node is, a RISC/6000 computer running AIX, the IBM version of the UNIX operating system. The processing nodes do not have to be RISC/6000 computers running the AIX operating system. Some or all of the processing nodes 102 can include different types of computers and/or different operating systems 108. All of these variations are considered a part of the claimed invention.

The present invention 202 may be implemented by combination of hardware and software. Moreover, the functionality required for using the invention may be embodied in computer-readable media (such as 3.5 inch diskette 228 or 110) to be used in programming a router 204 to perform in accordance with the invention. Computer programmeans or computer program in the present context mean any expression, in any language, code or notation, of set of instructions intended to cause a system having an information processing capability to perform a particular function either directly or after either or both of the following: a) conversions to another language, code or notation; b) reproduction in a different material form.

IP Network Computing Environment

Figure 2:
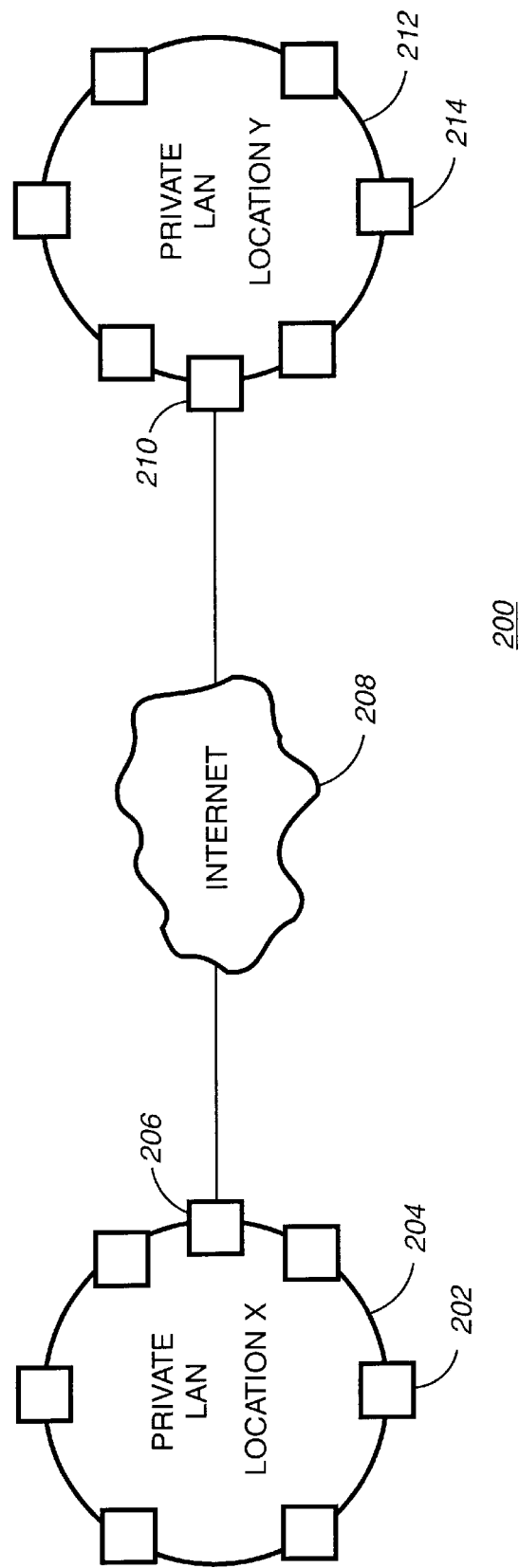
FIG. 2 depicts another embodiment of a distributed computer system for an IP networks such as the Internet, according to another aspect of the present invention.

Turning now to FIG. 2 shown is a block diagram of a IP (Internet protocol) network computing environment, 200 according to another aspect of the present invention. A plurality of client system 202 are coupled to a private network 204 at location X. At location Y, a second private network 212 couples a plurality of client systems 214. The private networks 204 and 212 communicate to each other through network access servers 206 and 210 over and IP network such as the Internet 208. The exact hardware and software combination of the clients 202 and 214, private network 204 and 212, network access servers 206 and 210 and IP network 208 is not important. The only requirement is that the private networks 204 and 212 support the multicast protocol such as a TCP/IP LAN. In one embodiment, the network servers 206 and 210 establish a point-to-point communication using tunneling. The clients 202 and 214 represent the nodes in the system and can be a uniprocessor or multiprocessor machine running an operating system such as Windows 3.1/95/98/2000/NT, Unix, Linus, AIX or equivalent with a network interface to private network. In this embodiment, the private network is a network that supports multicasting such as TCP/IP. I In one embodiment, all the nodes in private network 204 and private network 212 can be substituted for one another to provide redundancy in case of a failure. Stated differently, as is described below, the hardware and software configuration of the clients 202 and 214 are arranged such that any single client 202 or 214 can assume the role of the servers 206 and 210 to provide redundancy in case of a failure of either server 206 and 210.

Generalized Communications Network

Figure 3:
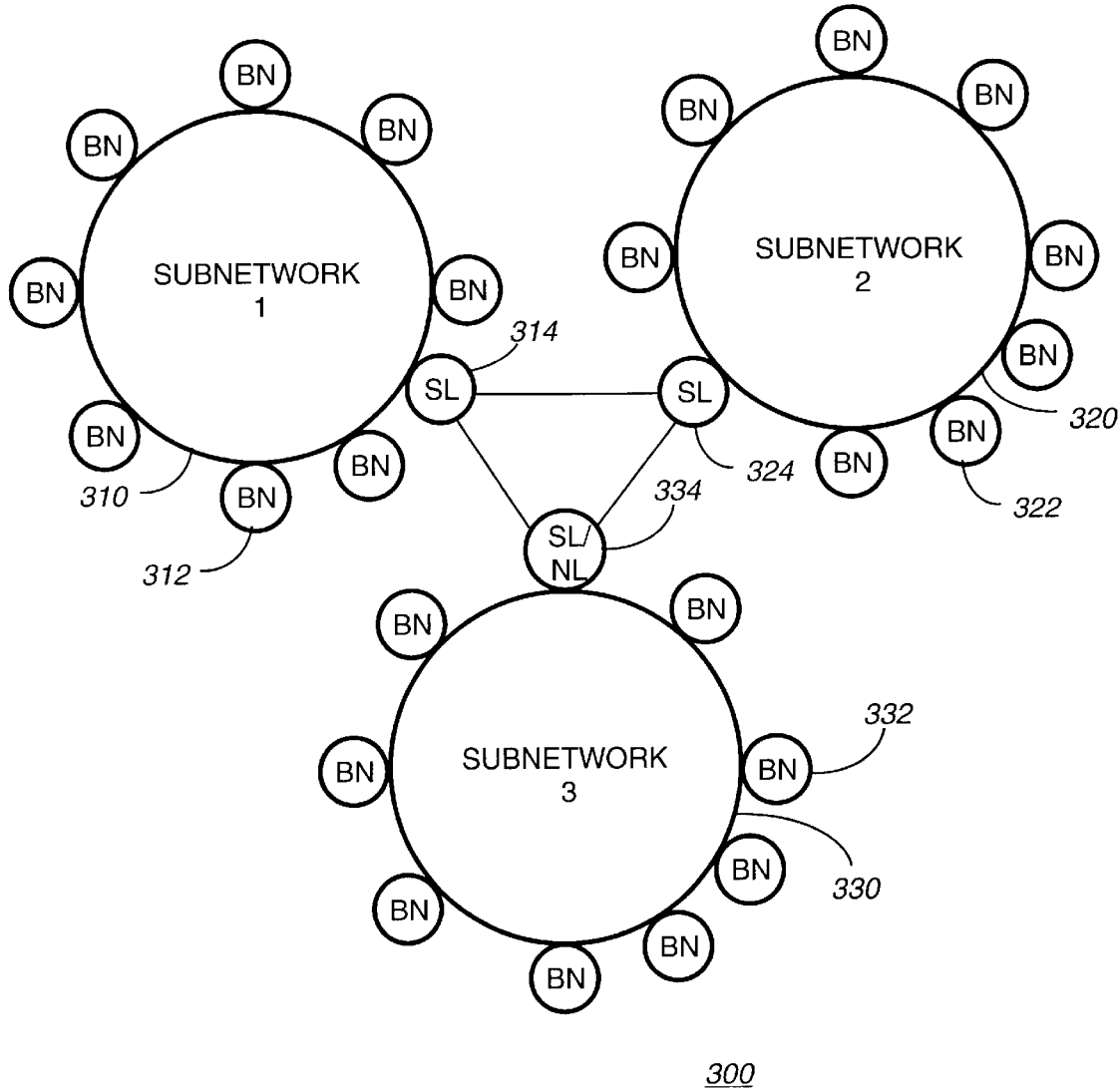
FIG. 3 is a block diagram of a more generalized communications network that can be embodied as the parallel processing architecture illustrated in FIGS. 1–2 or as the IP Computing environment of FIG. 3 above, according to the present invention.

A more generalized block diagram is shown in FIG. 3 that can be embodied as the parallel processing architecture illustrated in FIGS. 1–2 or as the IP Computing environment of FIG. 2 above. Turning to FIG. 3, is a block diagram of a communications network 300 consisting of a plurality of subnetworks. Three subnetworks are illustrated, subnetwork 1 (310), subnetwork 2 (320) and subnetwork 3 (330). Each subnetwork 310, 320 and 330 consists of a plurality of nodes, 312, 322, and 332 respectively. The nodes attached to each subnetwork 310, 320 and 330 are called beacon nodes because they broadcast over the subnetwork 310, 320, 330 a verification status, much like a beacon tower with a beacon of light on a hill which provides broadcasts its position to others viewing the hill. The beacon node is logically and equivalent to node 102 of FIG. 1 and client systems 202 and 214 of FIG. 2. A simple communication program with a subnetwork interface (not show) runs, collectively herein referred to as the beacon program, at the node 312, 322 and 332 and acts as a transceiver along the subnets 1–3 for broadcasting and receiving multicast messages. The beacon program periodically sends a short status datagram, which is called heartbeat message or beacon status message. The beacon message datagram is sent specifying that it should not be routed by any node in the communications network. Therefore, this beacon message is only propagated within the subnetwork of the node which originates a beacon datagram. Stated differently, a beacon message from subnetwork 1 (312) is sent along subnetwork 1 and not directly routed to any other subnetwork 2 (320) or subnetwork 3 (330). The confinement of the beacon message to the subnetwork in which it is associated assures that the traffic between subnetworks is kept to a minimum.

The beacon message over subnetworks 310, 320 and 330 using the multicast protocol. The mechanism used to control the distribution of the multicast messages is based in the Internet Group Management Protocol (IGMP) as specified in RFC 1112. This invention utilizes a specific group scheme for sending and receiving the beacon messages and the network status messages. In most implementations of the multicast protocol, the communication interface (network interface) of a node will not receive a multicast datagram if no program, which is running on the node, has subscribed to the specific multicast group to which the datagram is originated. This feature results in a benefit to the node because the processor in the node (Central Processing Unit or specialized processor) does not have to read and process the beacon message. Therefore, a node in a subnetwork is only burdened with the task of reading a multicast datagram, if there is a program running on the node which is interested in it. The beacon program takes advantage of the fact that multicast datagrams are only received if specific group subscriptions exist in a node to keep the overhead of the beacon program to a minimum.

One of the nodes in each subnetwork 310, 320, 330 is identified as a subnetwork leader (SL) node. In this embodiment, the SL node is a beacon node. The identification of the SL node in a subnetwork 1–3 is accomplished in several alternative methods. One method is to determine if the node with the highest or lowest address in the subnetwork is available to become a SL node. In another embodiment, the beacon programs exchange beacon messages with each other, and with this knowledge, they negotiate that one of the beacon programs assumes the role of the SL node. At any given time, there is only one SL in any given network. The SL subscribes to listen to multicast datagrams directed at one specific multicast subnetwork or group.

The beacon messages are directed at the SL node, and in normal operation the beacon messages are only received at these nodes. Therefore, in normal operation, there is only one node in any given subnetwork which is burdened with the task of receiving and processing beacon messages.

Figure 4:
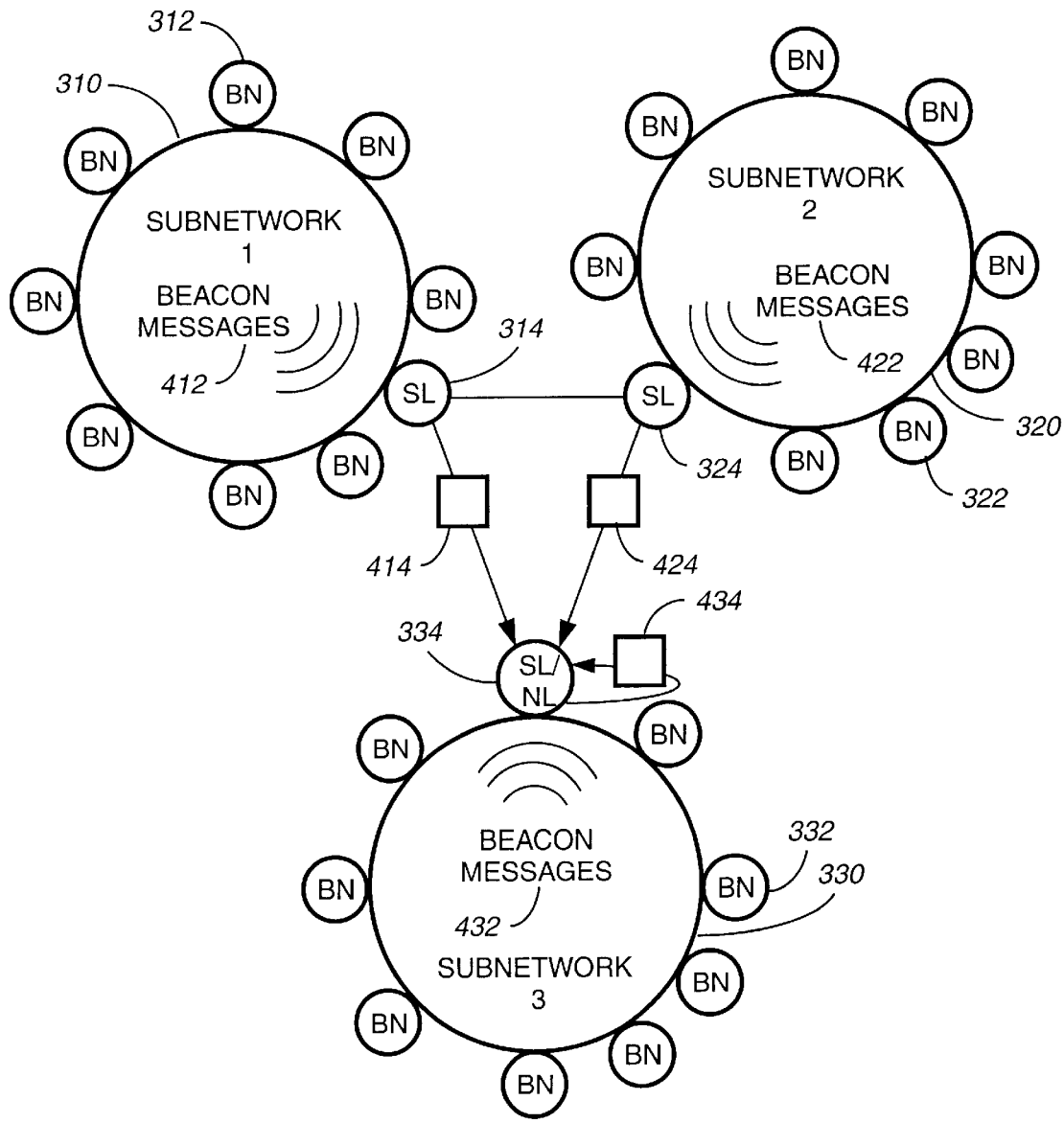
FIG. 4 is a block diagram of FIG. 3 illustrating the beacon messages being broadcast to the subnetwork leader along each subnetwork leader and from each subnetwork leader to the network leader, according to the present invention.

FIG. 4 is a block diagram 400 of FIG. 3 illustrating the broadcasting of beacon messages to the SL along each subnetwork and from the SLs to the network leader, according to the present invention. The beacon messages 412 from each node 312 in subnetwork 1 (310) is received by the SL 314. Similarly the SL 324 of subnetwork 2 (320) received the beacon messages 404 from beacon nodes 322 from subnetwork 320 and the SL 334 of subnetwork 3(330) receives beacon messages 404 from beacon nodes 322.

In addition to the heartbeat message or beacon messages 412, 422, 432, there is another class of messages, employed by the beacon program on the SL node 314, 324 and 334, which are directed to network leader (NL) 334 node called the subnetwork list 414, 424, 434. The NL node is a SL node that is identified to receive from each SL node the subnetwork list of heartbeat messages.

It is important to point out that the use of the (1) verification message and (2) the subnetwork list and the master list are sent over two different channels or two multicast groups. The use of two separate channels or multicast groups reduces the amount of network traffic required to be multicasted between nodes. Nodes such as Beacon Nodes or SL Nodes in turn have lower overhead at each node by eliminating the need to subscribe to all multicast messages, but rather subscribe to multicast messages only that they are part of the multicast group, i.e., the beacon nodes and the SL nodes.

Figure 5:
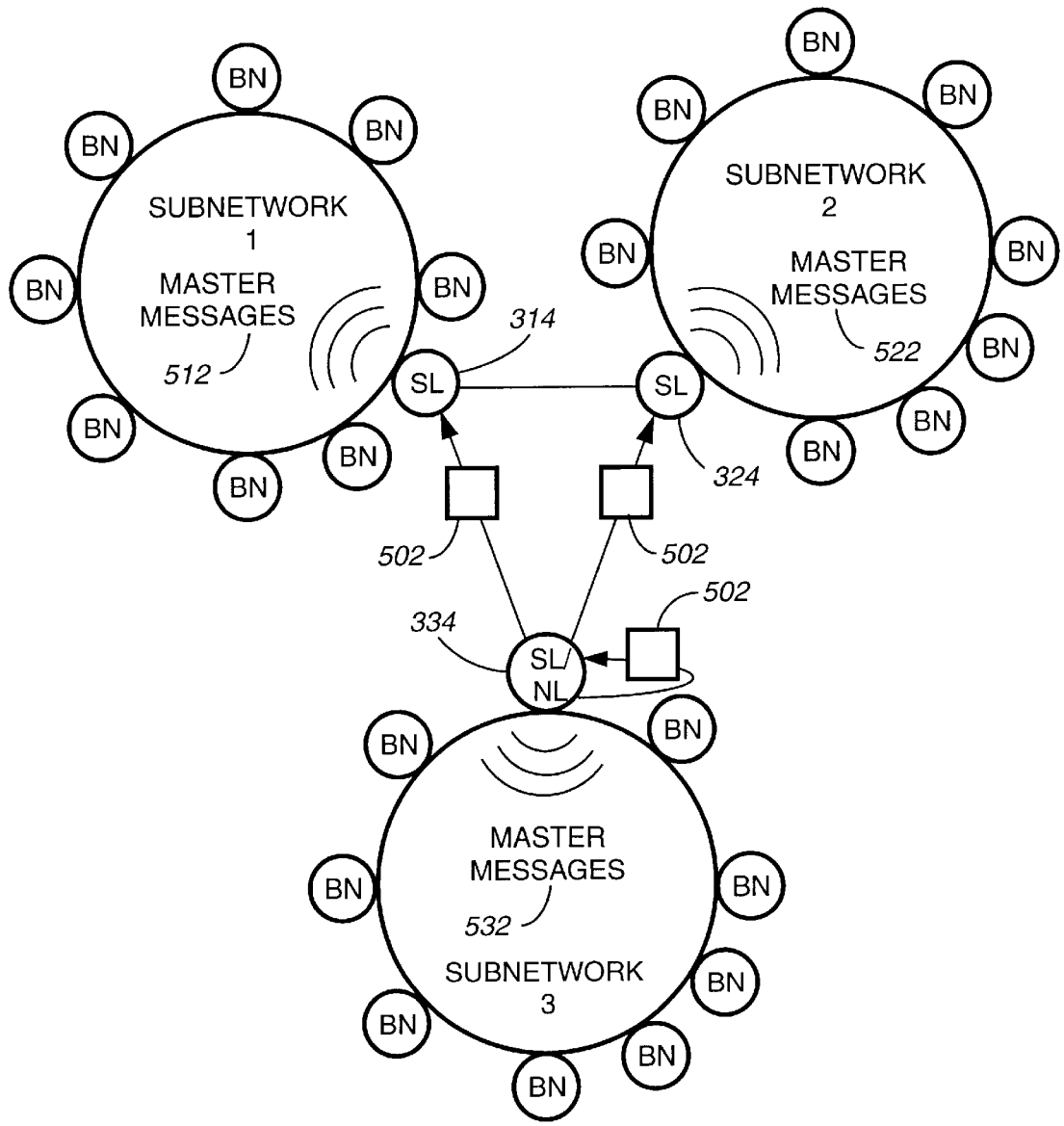
FIG. 5 is a block diagram of FIG. 3 illustrating the master list messages being broadcast to the subnetwork leader from the network leader and along each subnetwork and from each subnetwork leader, according to the present invention

Turning to FIG. 5, the NL receives the subnetwork lists 414, 424, 434 of beacon messages assembled by each SL for each subnetwork as discussed in connection with FIG. 4. The NL node assembles all of the subnetwork lists 414, 424, 434 from each SL into a master list 502. The NL then sends this master list 502 to each SL for distribution to each node coupled to the subnetwork. For example, the master list 502 sent from NL 334 to SL 314, 324 and SL 334. The master list 502 received by SL 314 is transmitted via multicast 512 over subnetwork 1 (310). The master list received by SL 324 is transmitted via multicast 522 over subnetwork 2. Similarly, the master list received by SL 334 (which is also the same node as NL 334) is transmitted via multicast 532 over subnetwork 3. In one embodiment, the SL nodes 314, 324 and 334 use IP tunneling to communicate with the NL 334. This allows point-to-point communication over and IP network.

The NL 334 is used to multicast the master list 502 which contain the heartbeat message of all nodes that participate in the communications network 300. All nodes 313, 324 and 334 subscribe to the SL, and therefore heartbeat message are received by all nodes that run the beacon program. In one embodiment, the beacon program in each node is identical and can assume not only the multicast transceiver function of sending the heartbeat message to the SL and receiving the master list from the SL, but identify the SL and identify the NL as well. In addition, the beacon program when identified as the SL assembles the subnetwork list and when identified as the NL assembles the master list. It should be understood that the subnetwork list are only originated by the SL node, and therefore, the flow of such lists does not flood the network. These subnetwork lists are also not routed, and so it does not impact any node outside of the subnetworks where it originates. The master list contain the status of all nodes in the network, and this service is of potential interest to all nodes. The beacon program only sends the master list to SL nodes. By creating this hierarchal relationship, the beacon program achieves the optimal flow of the multicast messages, and manages to monitor all the nodes in the network using minimal transmission bandwidth and minimal utilization of the processing resources in the communications network 300.

Summary of Overall Process Flow

In summary, as described above there are two kinds of nodes: beaconing nodes and SLs. The responsibility of a beaconing node is to send periodic beacons over the SL group, and to listen to master list messages (defined further below) over the NL group. If a BN does not hear from the SL within some interval, it will re-initiate the election for a new SL. Similarly, the responsibility of a SL is to collect the beacons of all the beacon nodes in its subnetwork, and compile an "subnetwork list." This list is sent to all the beacon nodes in the subnetwork, using a multicast over the NL group. At this point, after the election, all nodes in the subnetwork receive master list messages relative to the members of the subnetwork.

In one embodiment, the beaconing process joins both the NL group and the SL group multicast group. Each node in a subnetwork will only listen to subnetwork list information from an existing SL of its subnetwork. At the same time, the node starts sending "election messages" on the SL group. These messages contain instruction that the message are to be sent to the designated address only with "no forwarding", so that they will be confined to the subnetwork.

The SL node 314, 324, 334 is now receiving two kinds of messages:

(1) if there is no SL active in the subnetwork, the node will receive election messages from any other node. The election program is a simple one. The nodes are identified by unique numbers, and the SL elected will be the node with the highest node number to participate in the election. After some stabilization period, the elected node sends a message over the NL group, asserting its SL status. The nodes which get such message will now leave the SL group (only SLs need to listen to other nodes beacons). The liveness or beacon message of all nodes is transmitted in the from of master list 502 messages over the NL group.

(2) if there is an active SL in the subnetwork, the node will receive a master list message 502 over the NL group. Since there is already an active SL for this subnetwork, the node then leaves the SL group and just listens to master list 502 message from the SL.

Process Flows for Beacon Nodes

Figure 6:
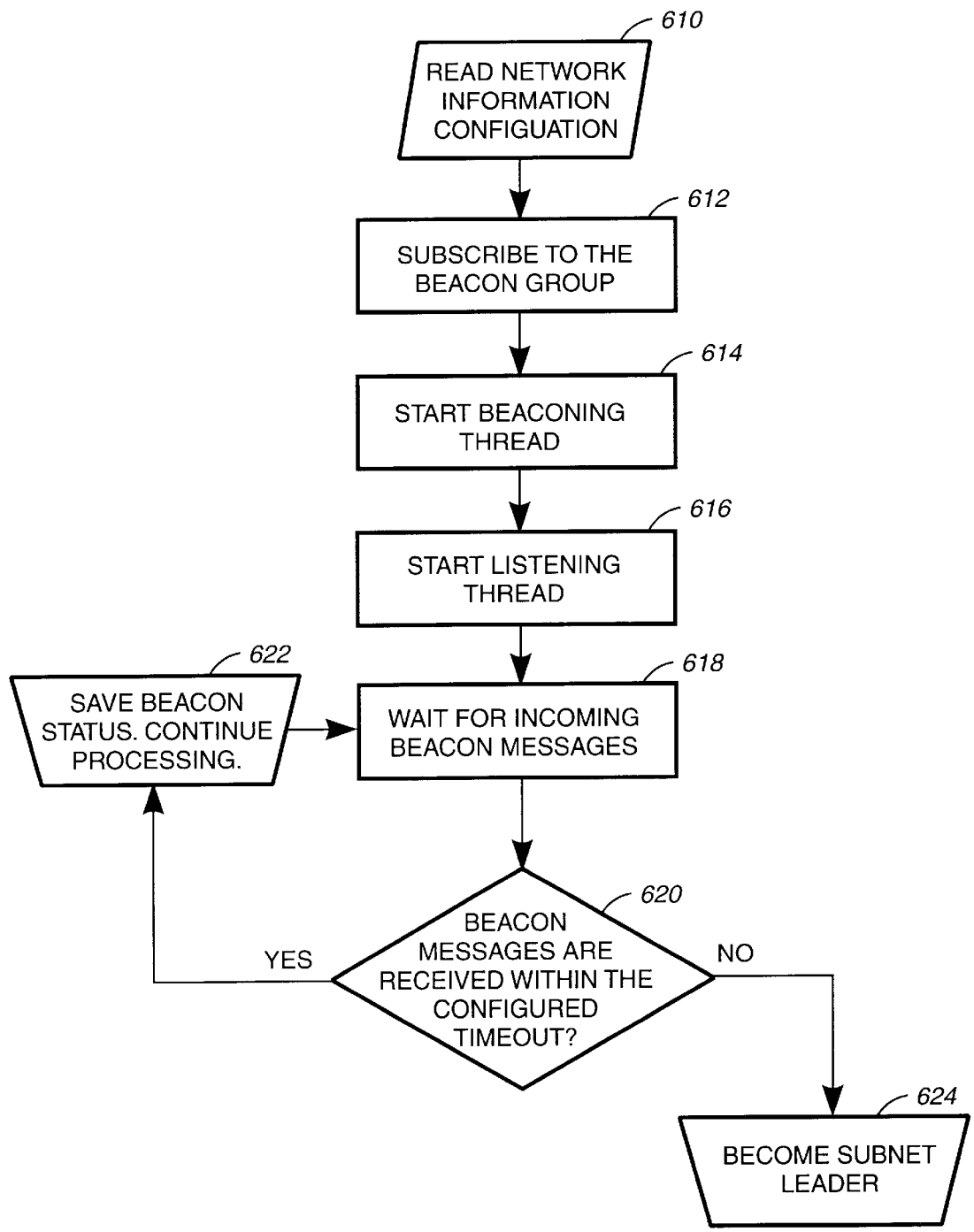
FIG. 6 is a flow chart showing the initialization procedure on a beacon node according to the present invention.

FIG. 6 is a flow chart 600 showing the initialization procedure on a beacon node according to the present invention. In this embodiment, the identification or election of the SL for each subnetwork is conducted during beacon program Initialization. In this phase, the beacon program will actually subscribe to both the SL group and the NL group. In step 610, the network configuration is read for the communication network 300. In step 612, each node subscribes to the beacon message status. In step 614, the beaconing thread is started, and in step 616, nodes start to listen for the beacon message from the beacon thread. In step 618, nodes wait for the incoming beacon messages. In step 620, a test is made to determined whether the beacon message are received within the configured timeout. If YES, then in step 622 corresponding beacon message status is saved and processing is continued. If NO, then in step 624 the node becomes SL.

In one embodiment to become a SL a node does not receive a beacon message from a node with a higher IP address on its subnework. The node then subscribes to the SL group and listens to beacon messages. If it does not hear a beacon message from a node with a higher IP address, than it will assume the role of SL.

In another embodiment, the identification of the SL or the NL can be chosen as taught in the U.S. Pat. No. 5,793,962, issued Aug. 11, 1998, entitled "System formanaging membership of a group of processors in a distributed computing environment", by inventors Badovinatz et al., and commonly assigned herewith to International Business Machines, which teachings are incorporated by reference in its entirety.

Process Flow for a SL Node

Figure 7:
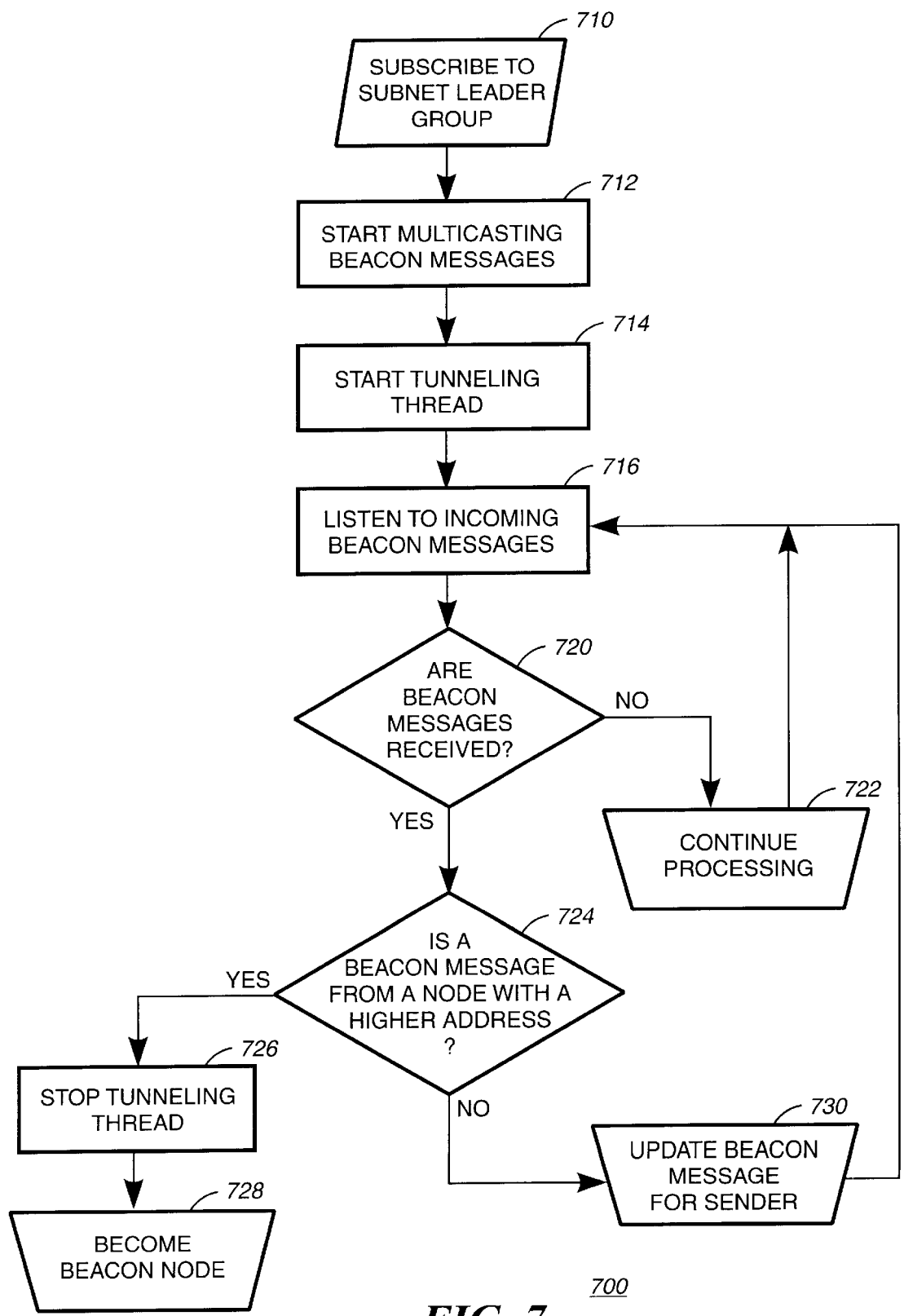
FIG. 7 is a flow chart showing the initialization procedure for a node once it becomes a subnetwork leader, according to the present invention.

Once a node becomes an SL, the process flow 700 for a SL is initiated as shown in FIG. 7. In step 710 the node subscribes to the SL group, and starts multicasting subnetwork list 414, 424, 434 messages in step 712. In step 714 tunneling thread is started to achieve point-to-point communications over an IP network, and in step 716, the node starts to listen to incoming master list 502 message. In step 720 a decision is made whether or not master list 502 message are being received. If NO, then processing is continued in step 730 and the flow loops back to step 716. If YES, then the tunneling thread is stopped in step 726 and a decision is made in step 728 whether or not the message received is from a higher IP address. If YES, then in step 726 the node reverts back and becomes a beacon node. If NO, then in step 728 master list 502 message is transmitted along the subnetwork for which the SL is coupled.

Overview of Electing an NL Among SLs

It is important to point out that when a SL contacts another SL, an NL election protocol is run similar to the one carried out by the beacon nodes for the SL previously described above. The purpose of this election is to determine the Network Leader (NL), which compiles the subnetwork list for all node. Therefore when the connection is established between two SLs there are two possibilities:

1. One of the SLs may already know who is the NL. This will end the other SL's search for more SLs. It will then also connect to the NL, receive the master list 502 for all nodes in each subnetwork and the information of which nodes are currently SLs. The SL It will then establish a link to any SL that it does not have a connection for.

(3) If none of the SLs knows who the NL is, the search proceeds as above. After anstabilization period one of the SLs gets elected as NL.

Process Flow for SL to Communicate With Other SLs

In the beaconing program, two multicast groups are allocated for the beacon process: one is used for sending beacons to the SL node (SL group); and one is used by the SLs to send subnetwork lists to NL (NL group). This is done to make sure that each node only receives the messages, which are relevant to its current status as a beaconing node (BN) or subnetwork leader (SL).

Each node in the communication network running the beacon program may be in one of at least three states. The first state is where the node may be a beacon node. The beacon node will refer the contacting SL to the IP address of the current SL for that subnetwork (this is called a redirection). The contacting SL is thus redirected to the current SL of the subnetwork, and they establish the tunnel as above.

Figure 8A:
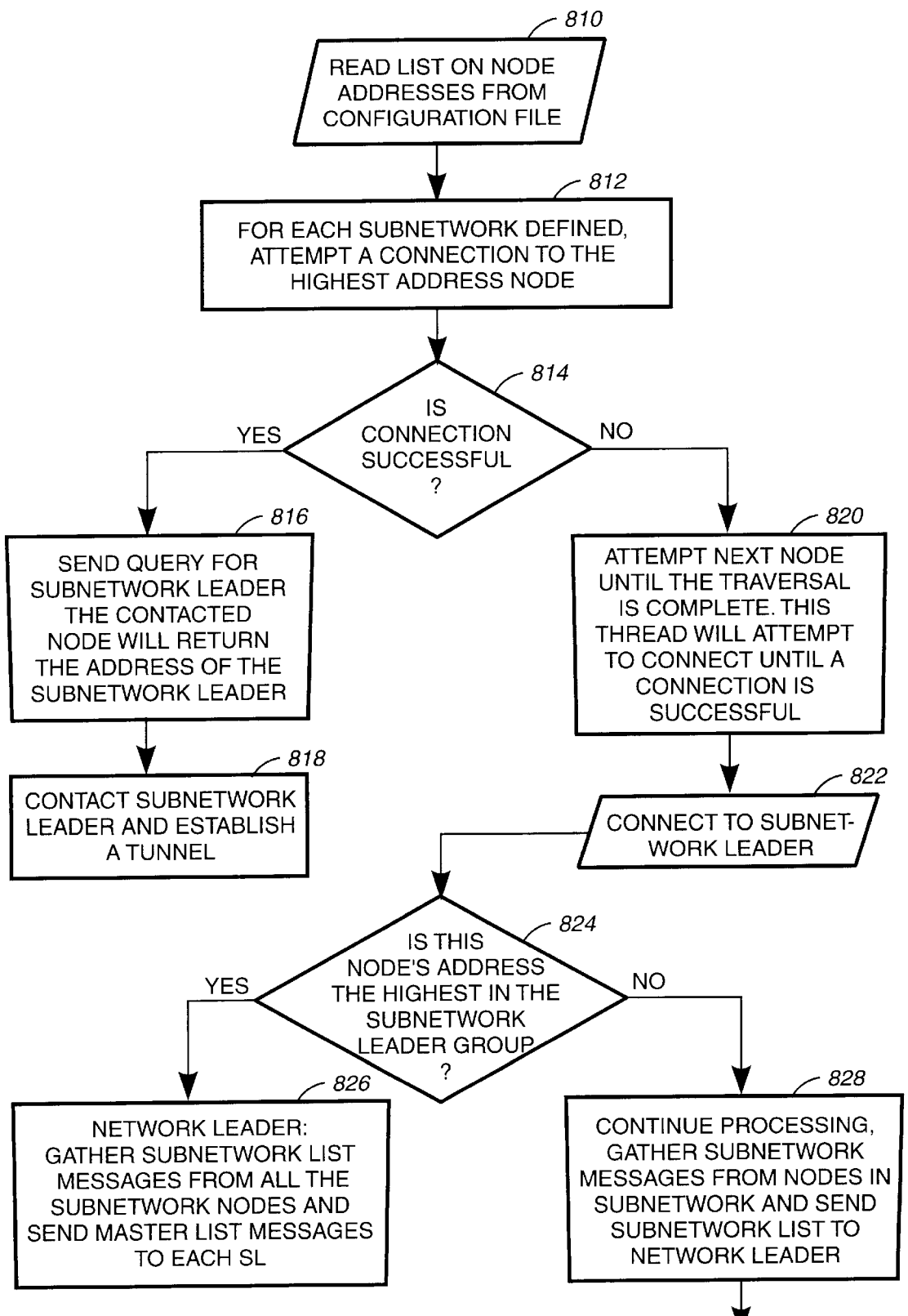
FIGS. 8A and 8B is a process flow of the communications flow from a subnetwork leader to another subnetwork leader and showing the establishment of tunnels according to the present invention.
Figure 8B:
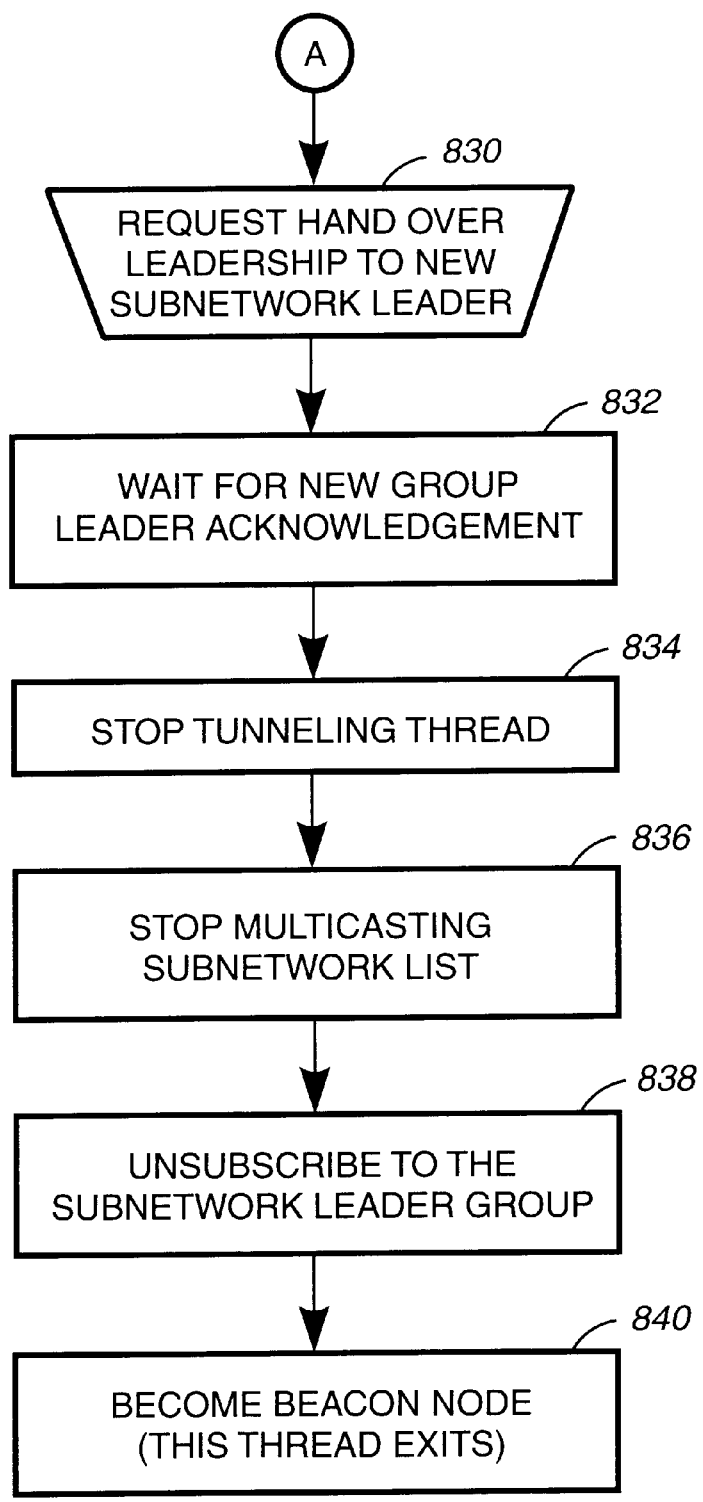

The second state is where the node is an SL. In this case the IP link is maintained, and a multicast tunnel is established over the link. The two connected SLs will then exchange subnetwork lists, which will help both in narrowing down their search for other SLs. The third state is where the node is in SL election mode. In this case, it returns a list of the nodes that are also participating on the election, and the contacting SL will exclude those of its search. The contacting SL will then hang on to the connection until the election is over, and will then be redirected to the elected SL. Describing now in further detail is when the node is a SL state to establish communications with other SLs, each 314, 324 and 334 searches for SLs from other subnetworks. FIGS. 8A and 8B is a process flow of the communications flow from a SL to another SL and showing the establishment of tunnels according to the present invention. In step 810, the list of node addresses is read from the configuration file. In step 812, for each subnetwork defined, an attempt is made to connect to the highest address node. In step 814, a decision is taken whether or not the connection is successful. If YES, then in step 816 a query is sent for the subnetwork leader, and the contacted node will return the address of the SL. In step 818 the SL is contacted and a tunnel is established. If the answer to the decision of step 814 is NO, then in step 820 an attempt is made to contact the next node, and continued until the traversal is completed. This thread is continued until a connection is successful. In step 822, a connection is made to the SL. Next, in step 824 the decision is taken whether or not this node's address is the highest address in the group of SLs. If YES, then in step 826 this node also becomes the NL node, and starts to gather subnetwork messages 412, 422, 432 from all the subnetwork nodes and to send combined master list 502 message back to each SL. If the answer to the decision of step 824 is NO, then in step 828 processing is continued, and subnetwork list message 414, 424, 434 is gathered from nodes in the subnetwork and subnetwork list message 414, 424, 434 is sent to the Network Leader (NL).

In the event that a SL receives a beacon message from a node with a higher IP address, then it will revert back to the simple role of a beacon node, that is, a node that is not either a SL node or a NL node. In the process of reverting back to a beacon node, the SL will hand off the tunneling endpoint to the new SL, see flow chart of FIG. 8B. In step 830 a request is made to hand over leadership to a new SL. In step 832, the node waits for the new group leader to give an acknowledgment. In step 834, the tunneling thread is stopped and in step 836 the multicasting of subnetwork messages 414, 424 and 434 is stopped. In step 838 the node unsubscribes to the SL group, and in step 840, the node becomes a beacon node and this thread exits.

Using the process flows described in FIGS. 6–8 above, the present invention solves the problem of maintaining an efficient heartbeating network which monitors the health of a set of adapters. The novel beacon program described has the fundamental difference that it is based on multicast. As a result, the communication structure is much more hierarchical, and based on subnetwork leaders. It also uses two multicast communication channels, one for sending beacons (heartbeats) and one for sending membership deltas. As a result the network traffic is kept to a minimum, and the beacon program has better scalability. Once each SL completes the connection process flow above, every node in each Subnetwork 1–3 may be contacted over multicast.

In addition it should be understood that in one embodiment, the beacon program described herein establishing multicast tunneling endpoints at each SL, the resulting infrastructure is capable of routing multicast messages to any node in the communications network independently of the network topology. By establishing this multicast routing network, it becomes possible to send a multicast message on a well-known port that can reach any node in the communication network. This is important for implementing a service location facility, i.e., a facility which can find any application which is currently running on the communication network.

The next step is to grow this structure to involve multiple subnets. This is done by applying the same beacon program at the network level, this time using point to point IP, since multicasts may not be routed. This time, only one channel is used, the point to point IP connection. Once elected, the SLs will try to discover other SLs outside of their subnetwork. They do so by utilizing the list of all IP addresses in the communications network, which is part of the beacon subsystem configuration. The SLs exclude from their search the adapters which are already members of their subnetwork. They now try to establish point-to-point connections to the other nodes.

After some stabilization period, a SL network is formed over IP, sustaining multicast tunnels that span the entire communications network. In summary, the flow of messages in the communications network for the beacon nodes, SL and NL are as follows:

(a) The beacon nodes continue to beacon periodically over the SL group.
(b) The SLs listen to the beacons of all the beacon nodes in their subnets, and periodically send a subnetwork list message (SLM) to the NL.
(c) The NL compiles the SLM for all subnets and compiles a master list message (MLM). This message is sent back to the SLs over the point to point links.
(d) The SLs receive the MLM and propagate it to all the nodes on their subnetwork using a multicast over the NL group. Note that the message in this case is only put in the wire once, and received by all nodes in the subnetwork. This reduces dramatically the network traffic.

An Embodiment for Self Organizing Self Similar, Fault Tolerant Package Switching Each of the nodes, 202, 206, 210, and 214 in FIG. 2 above contain a network address. In the case of the industry standard IP protocol, the IP address contains several fields including a sub-address. In one embodiment, these network addresses are stored in a configuration file. The configuration file lists all the nodes in the network which are to be part of the self similar structure. The configuration files is made available to every node in the network during the broadcast of the master list 502.

An exemplary configuration file is shown in Table 1 below. Each node may be configured with a weight, which is used in determining the preference that each node should have in becoming the gravitational center of the network (network leader). The higher the value in the weight field, the higher the probability that a node will be used as the gravitational center.

TABLE 1

Exemplary Configuration File

| IP Address | Subnet-work Mask | Gravitational Weight |
|---|---|---|
| 9.1.1.1 | 255.255.25 5.0 | 1 |
| 9.1.1.2 | 255.255.25 5.0 | 2 |
| 9.1.2.1 | 255.255.25 5.0 | 3 |
| 9.1.2.2 | 255.255.25 5.0 | 4 |
| 9.1.2.3 | 255.255.25 5.0 | 5 |
| 9.1.3.1 | 255.255.25 5.0 | 6 |
| 9.1.3.2 | 255.255.25 5.0 | 7 |
| 9.1.3.3 | 255.255.25 5.0 | 8 |
| 9.1.3.4 | 255.255.25 5.0 | 9 |
| 9.1.1.6 | 255.255.25 5.0 | 10 |

The weight number is used in the election of the network leader. The subnetwork leader with the highest weight value will be elected. In the case of a tie, the node with the highest IP address will be chosen as the network leader. Once a network leader has been chosen, the network leader will remain the network leader for as long as the network leader is available, unless the network leader needs to give up is leadership as re result of a network merge operation, as described below.

A subnetwork address for a subnetwork can be derived by taking an appropriate mask and Boolean ANDing with the network address. For example, given an IP address of 222.222.222.222 using the mask of 255.000.000.000 one can isolate the first portion of the address in this case. By isolation the address of the subnetwork, the number of "hops", that is the number of intermediate routing nodes it takes to reach the destination node can be calculated. The number of hops to reach each node provides a "weight" for each network and this is used to calculate the gravitational center of the network as further described below.

A. Overview of Electing the Network Leader and Merging Networks

The first stage of the formation process of a network is the election of subnetwork leaders by nodes which reside in the same subnetwork. The second phase is the election of a network leader by the subnetwork leaders. When a subnetwork leader gets elected, the subnetwork leader contacts other subnetwork leaders, and query them if the network presently has a network leader. The subnetwork leader will attempt to contact one subnetwork leader for each subnetwork, until the subnetwork leader discovers that either a network leader exists, or until the subnetwork leader has queried all the subnetwork leaders that the subnetwork leader has reachability with via multicast. If a subnetwork leader completes the search for a network leader, and the search reveals that no network leader exists, than the subnetwork leader that performed the search will propose an election, and the subnetwork leader with highest weight is chosen.

This method will ensure that a' single network leader gets elected in most cases. Nevertheless, there are cases which involve a temporary loss of communication in which it is possible for two or more networks to be formed independently. When the communication failure is fixed, these individual networks will eventually sense each other, since the subnetwork leaders periodically look for other subnetwork leaders. If two subnetwork leaders discover that they are reporting to different network leaders, they will initiate a merge operation. In order to merge one or more independently formed networks, the network which has the network leader with the highest weight is preserved, and any additional network is dissolved. The process of dissolving a network involves sending a message to all the current subnetwork leaders in the network being dissolved to the effect that they need to detach from their present network, and re-initiate the attachment procedure. During the attachment procedure, the subnetwork leaders are required to do an exhaustive search for other network leaders, and they will then find one or more subnetwork leaders from the network which was preserved, and will then decide on an attachment point which is the closest to the gravitational center (network leader) of the surviving network.

B. Overview of Choosing Attachment Points

The subnetwork leaders are required to maintain a connection to a node which belongs to a higher tier of the network, or to the network leader itself (if the node is in tier 0). This connection is referred to as the "point of attachment" (attachment point) of the node to the network. The decision of the location of the attachment point is done by the subnetwork leader which is joining the network. The connection subnetwork leader will choose the attachment point which results in the least distance to the leader of the network (gravitational center). The measure used to determine this distance is the number of IP routers that exists between the connecting subnetwork leader and the network leader. This distance is also referred to as the number of "hops" (forwarding steps) that a datagram that originates from the subnetwork leader must do to in order to reach the network leader. This measure can be discovered at runtime using the. standard IP trace routing facility.

C. Exemplary Process Flow for Self Organizing Self Similar Network

Figure 9:
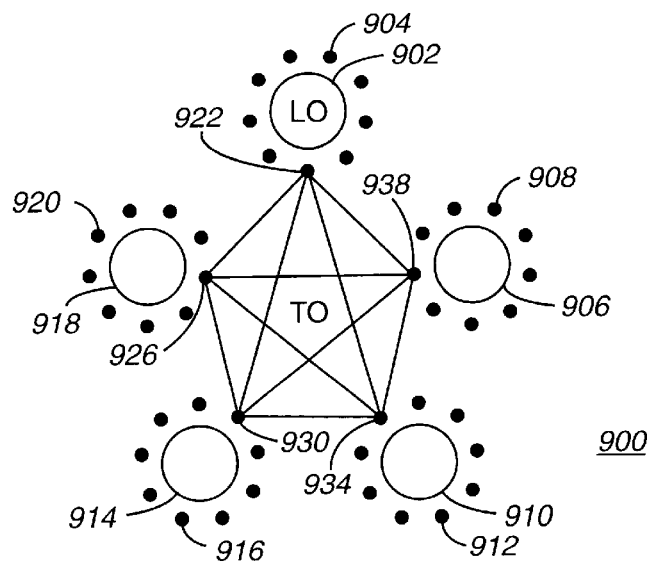
FIG. 9 is a diagram of a generalized communications network of FIG. 3 illustrating possible connections in a network with five subnetwork leader nodes and one network leader node, for fault tolerant package switching, according to another aspect of the present invention.

Turning now to FIG. 9 is a diagram of a generalized communications network 900 of FIG. 3 illustrating possible connections in a network with five subnetwork leader nodes and one network leader node, for fault tolerant package switching, according to anotheraspect of the present invention. There are five clusters of subnetworks shown 902, 906, 910, 914 and 920, each subnetwork with a plurality of nodes, 904, 908, 912, 916 and 920. Note from each of the subnetworks 902, 906, 910, 914 and 920, there are four connections possible to connect with the other subnetworks 902, 906, 910, 914, and 920.

As described above, each of the nodes in the subnetworks 902, 906, 910, 914 and 920 elect a SL node. In this network 900 the SL nodes are the nodes with the lines connecting the other subnetworks, 922, 926, 930, 934, and 938. The SL nodes 922, 926, 934, and 938 elect a network leader node. In this illustration 900, the NL node is 922 which is denoted with L0.

In this illustration 900, the hierarchical group can be formed automatically as follows. First each node has a configuration file of all the addresses of all other nodes on the subnet network. Each subnetwork 922, 926, 930, 934 and 938 elects a SL node 922, 926, 934, and 938 using IP multicast datagrams. These SL nodes try to attach to another subgroup outside of their own subnetwork. The SL node chooses a node outside of the subnetwork and posts a query of the network status. The SL nodes outside the network replies with the status (i.e., availability via subnetwork messages described above) of all the other nodes report the SL nodes. Returning to the example, in the subnetwork when SL node 922 communicates with SL node 926, the status of all other nodes 908 which SL node 926 is the SL node are reported back to the SL node 922. The SL node tries to connect to the best possible tier of the network structure, based on the following process:

(4) A node joins its own subnetwork. The members of a subnetwork send multicast messages to each other, without requiring package routing.

(5) The members of the subnetwork elect a SL node as described above.

(6) The SL node looks for other leaders, and tries to join a tier which is closest to the NL node 922. The NL node 922 is the leader of the lowest numbered tier of the self similar structure, tier T0. In order to find the other SL nodes, each SL node sends a query message to nodes outside of its own subnetwork.

(7) When a SL node receives such a query, it replies with all the information that is has gathered so far about the network including information about its own subnetwork. With this information, each SL node determines an optimal point of attachment in the self similar infrastructure by calculating the minimal distance (number of hops) to the NL node 922. To determine this, it calculates its distance to each possible attachment point, and then calculates the distance of the attachment point to the SL node.

(8) The SL node then joins the tier at the optimum attachment point. The leader of this tier is in turn attaches to a tier that is closer to the NL node 922.

This process is further illustrate in FIG. 12 below.

Balanced Multicast Tree Embodiment

A balanced multicast tree which is centered around a gravitational center such as the NL node 922. The network administrator may give weights to each node in the network which are used to determine a preference for the NL node 922. If a SL node has a calculated distance which is smaller to the surrounding SL nodes, then the distance of the current NL node to the surrounding SL nodes, then the SL node with the smallest distance to the surrounding NL nodes is favored as the choice for NL node 922.

Sample Self Similar Expansion With Degree 8

The degree number determines the maximum number of connections that a given node in a network may have. The degree also determines the maximum number of members of any given grouping of nodes. Since any routing node may need to belong to two groups, the maximum number of members of any group can be determined by dividing the degree number by two, and then adding one. In this example the maximum number of members is therefore 8/2+1, which is 5. This results in a fully connected pentagram that determined the topology of the self similar structure of the routing tree as shown in FIG. 9.

Figure 10:
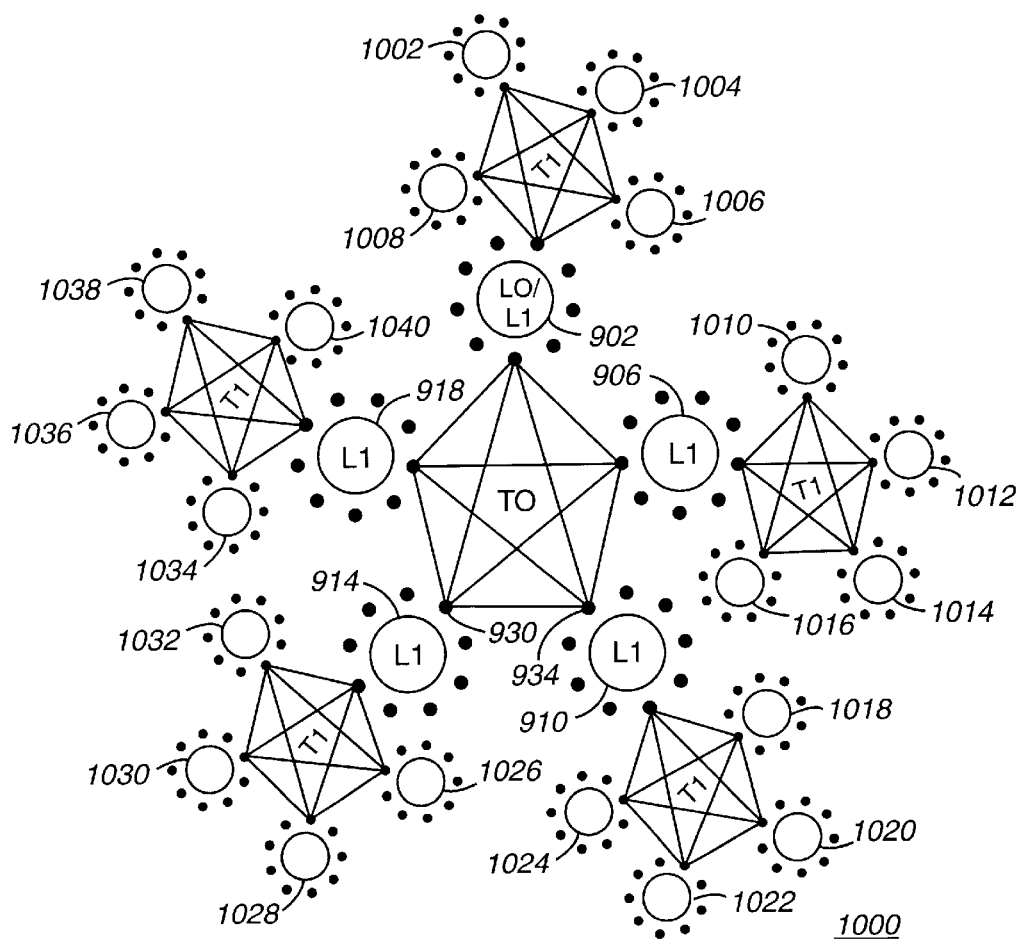
FIG. 10 is a diagram of a generalized communications network of FIG. 9 illustrating a first expansion of each subnetwork leader node, according to the present invention.

In the first expansion of this basic structure, nodes that reside in different subnetworks will choose the SL nodes (denoted as 922, 926, 930, 934, and 938) which are already connected to the lowest tier, T0. Each of the already established SL nodes willaccept connections from other subnetwork leaders, up to the allowed degree of the network. Here in this example the degree is 8, and since each leader in the figure above already has 4 connections, the remaining number of connections leader T0 can accept is 4. These 4 connection are form the leaders on a higher numbered tier, T1 as shown in FIG. 10. Note only a few nodes in tier 2 are labeled, to reduce the complexity of the illustration.

FIG. 10 is a diagram 1000 of a generalized communications network of FIG. 9 illustrating a first expansion of each subnetwork leader node, according to the present invention. Each leader is now labeled L1, because it functions as a leader for the higher tier, T1. The tier leaders have the responsibility of keeping connections with members of both tiers, i.e., T0 and T1. Notice that the NL node 922 is the only node which can assume the leadership of two tiers, and so it is labeled L0/L1.

Figure 11:
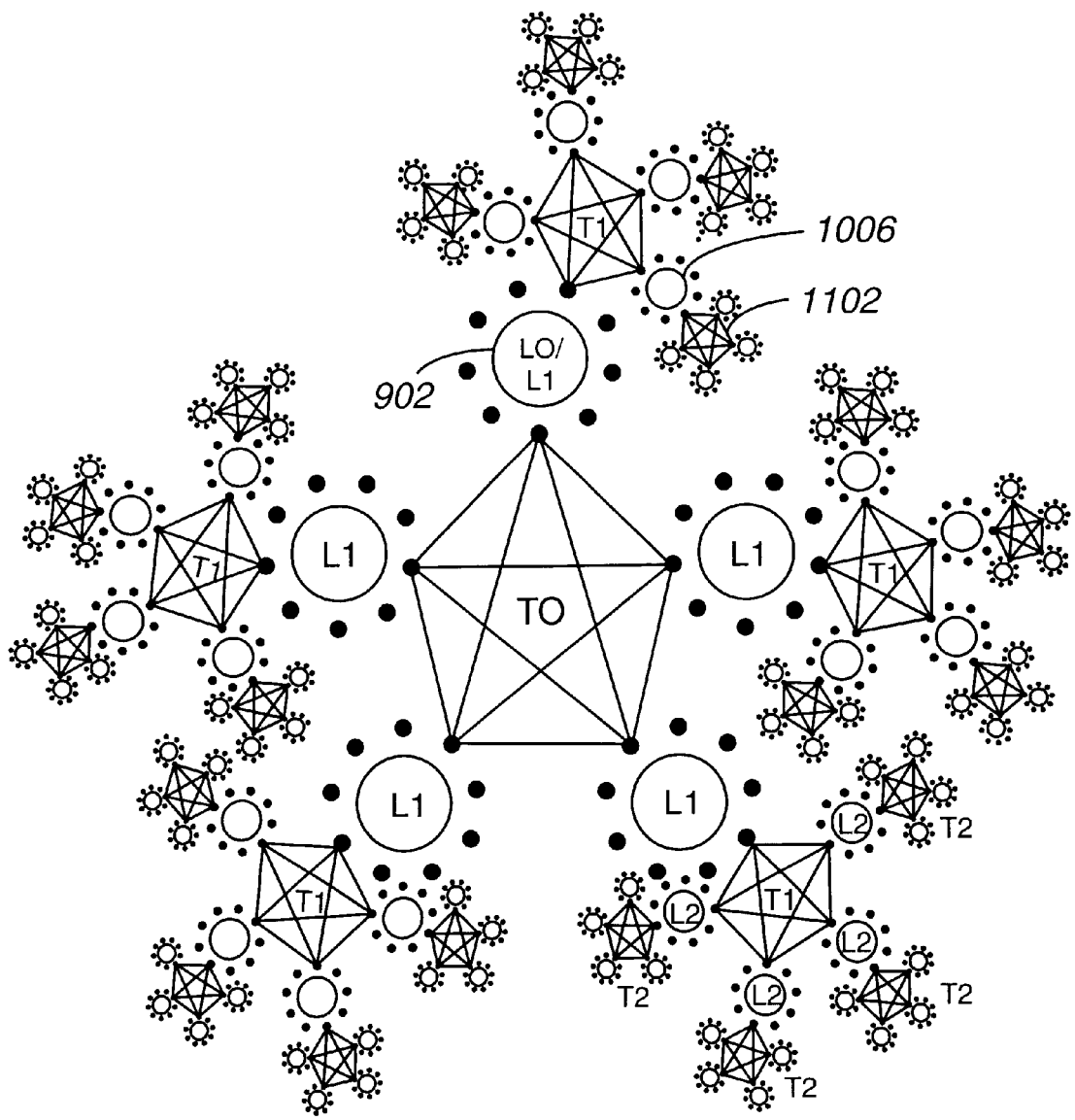
FIG. 11 is a diagram of a generalized communications network of FIG. 9 illustrating a second expansion of each subnetwork leader node of FIG. 10, according to the present invention.

In FIG. 10 note that all the L1 leaders, which are part of tier T0, have reached the maximum number of allowed connections. In this example the maximum number of connections is 8. Each L1 (for example SL node 938) has a total of four connections to each other SL node 922, 926, 930, 934, and SL node 938 has four connections at the T1 level nodes 1006 to yield a total of 8. Further leader nodes will have to attach to the leader nodes which are part of tier T1. These nodes then become the leaders of a second tier, T2 and are labeled L2, as illustrated in FIG. 11. Again only a few nodes in tier T2 are labeled, to reduce the complexity of the illustration. FIG. 11 is a diagram of a generalized communications network of FIG. 9 illustrating a second expansion of each subnetwork leader node of FIG. 10, according to the present invention.

Sample Self Similar Expansion Flow Diagram For Each Node on A Subnetwork

Figure 12:
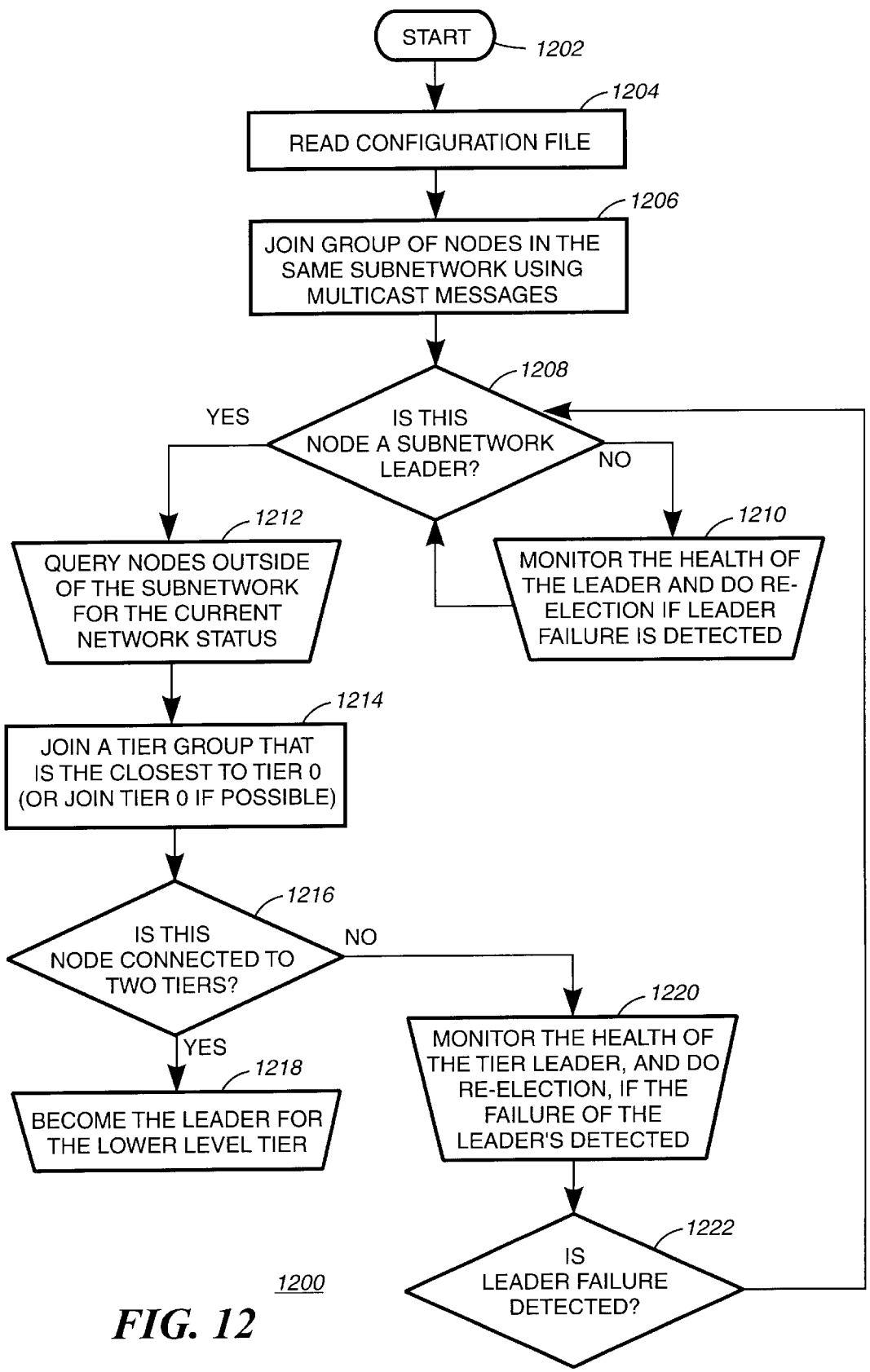
FIG. 12 is a flow chart of the process flow for generating the expansion of FIG. 9–11, according to the present invention.

FIG. 12 is a flow chart of the process flow 1200 for generating the expansion of FIG. 9–11, according to the present invention. During the description off this process flow, reference is made to FIG. 9–11 as an exemplary network, but it should be understood that many other network topologies are possible. The process begins with the configuration file containing the address of all the nodes in the subnetwork, steps 1202 and 1204. The nodes 904 join nodes in the same subnetwork using multicast messages, step 1206. A test is made to determine if a SL node is selected, step 1208. If no SL node is determined, the status message from each node or beacon message is reviewed and a new SL node is elected as described above. Once a SL is selected, the SL node 922 queries nodes outside the subnetwork 902 and finds the status of other subnetworks 906, 910, 914, and 918 from their respective SL nodes 926, 930, 934, and 938, step 1212. The SL node joins a tier group that is closest to tier T0 or joins T0 directly if possible, step 1214. If the SL node is a member of two tiers, it becomes the leader for the lower tier, steps 1216 and 1218. If the SL node is not a member of two tiers, the SL node monitors the health of the current tier leader through examining the master list messages 502 and if the current tier leader is unavailable or failed, the process returns to step 1208 to elect a new SL leader for that subnetwork.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for determining the availability of at least one node in a communications network with one or more subnetworks wherein each subnetwork comprises at least one node coupled thereto and a node identified as a subnetwork leader, and the communications network comprises one node identified as a network leader, the method comprising:
   periodically multicasting on a subnetwork, a verification message from at least one node coupled on the subnetwork;
   building on the subnetwork leader for a group of one or more subnetworks, a subnetwork list of nodes that have sent the verification message;
   transferring the subnetwork list from the subnetwork leader for the group of one or more subnetworks to the network leader node;
   assembling on the network leader, a master list comprising at least one subnetwork list of nodes that have sent the verification message; and
   transferring the master list from the network leader to the subnetwork leader for the group of one or more subnetworks.

2. The method according to claim 1, further comprising the step of:
   multicasting from the subnetwork leader for the group of one or more subnetworks from the master list.

3. The method according to claim 1, further comprising the step of:
   selecting a subnetwork leader on at least one subnetwork from the at least one node coupled thereto.

4. The method according to claim 3, wherein each node is given an address and the step of selecting a subnetwork leader includes dynamically selecting a subnetwork leader by choosing a node in the group of one or more subnetworks that is capable of sending verification messages that has the highest network address.

5. The method according to claim 1, further comprising the step of:
   selecting a network leader on the communications network.

6. The method according to claim 5, wherein each node is given an address and the step of selecting a network leader includes selecting a network leader with the highest network address.

7. The method according to claim 5, further comprising the step of waiting a predetermined period of time for network leader to send the master list, and if the network leader fails to send the master list, selecting a new network leader on the communications network.

8. The method according to claim 3, further comprising the step of waiting a predetermined period of time for the subnetwork leader to forward the master lists received from the subnetwork leader and if the subnetwork leader fails to respond, selecting a new subnetwork leader on the communication network.

9. The method according to claim 1, wherein the periodically multicasting includes multicasting using IP multicast on a first channel and wherein transferring the subnetwork list includes transferring the subnetwork list on a second multicast channel and wherein transferring the master list includes transferring the master list on the second multicast channel.

10. A method on a first node for determining the availability of at least one node in a communications network with one or more subnetworks, the method comprising the steps of:

coupling the first node to a subnetwork in the communications network containing at least one subnetwork with one or more nodes coupled thereto;

determining if any subnetwork leader node is identified in the subnetwork, and if there is no subnetwork leader node identified, then identifying the first node as a subnetwork leader node; and periodically multicasting on the subnetwork, a verification message for reception by the subnetwork leader; and receiving a master list from the subnetwork leader in the subnetwork of the communications network, the master list contains an assembly of a subnetwork list from a group of one or more subnetworks, each subnetwork list containing a list of the verification message received by a subnetwork leader of each node coupled to the subnetwork, the master list assembled by a network leader from the group of one or more subnetworks that have sent the subnetwork list to the network leader node, and the master list sent from the network leader to subnetwork leader for the group of one or more subnetworks.

11. The method at a first node according to claim 10, further comprising the step of:

determining if any network leader node is identified in the communications network, and if there is no network leader node identified, then identifying the first node as a network leader node.

12. The method at a first node according to claim 10, wherein the step of receiving a master list from the subnetwork leader includes receiving a master list via multicast from the subnetwork leader.

13. The method at a first node according to claim 10, wherein the step of receiving a master from the subnetwork leader includes receiving a master list from the subnetwork leader in the subnetwork of the communications network, the master list contains an assembly of a subnetwork list from the group of one or more subnetworks, each subnetwork list containing a list of the verification message received by a subnetwork leader from each node coupled to the subnetwork, the master list assembled by a network leader of the group of one or more subnetworks that have sent the subnetwork list to the network leader node, and the master list sent from the network leader via multicast protocol to the subnetwork leader for the group of one or more subnetworks.

14. The method at a first node according to claim 10, wherein the step of receiving a master from the subnetwork leader includes receiving a master list from the subnetwork leader in the subnetwork of the communications network, the master list contains an assembly of a subnetwork list from the group of one or more subnetworks, each subnetwork list containing a list of the verification message received by the subnetwork leader from each node coupled to the subnetwork, the master list assembled by a network leader of the group of one or more subnetworks that have sent via multicast protocol the subnetwork list to the network leader node, and the master list sent from the network leader to the subnetwork leader for the group of one or more subnetworks.

15. The method at a first node according to claim 10, wherein the step of periodically mutlicasting includes multicasting using IP multicast on a first channel and wherein the step of receiving a master list from the subnetwork leader includes receiving a master list on a second multicast channel.

16. A method at a subnetwork leader on a subnetwork for determining the availability of at least one node in a communications network with one or more subnetworks wherein each subnetwork comprises at least one node coupled thereto and a node identified as a subnetwork leader, and the communications network comprises one node identified as a network leader, the method comprising the steps of:

receiving a multicast verification message on the subnetwork from at least one node coupled on the subnetwork;

building a subnetwork list of nodes that have sent the verification message;

transferring the subnetwork list from the subnetwork leader to the network leader node; and receiving from the network leader a master list assembled comprising at least one subnetwork list of nodes that have sent the verification message.

17. The method at a subnetwork leader according to claim 16, further comprising the step of:

multicasting the master list on the subnetwork.

18. The method at a subnetwork leader according to claim 16, wherein the step of receiving multicast verification message includes receiving a multicast verification message on the subnetwork that contains a status from at least one node coupled on the subnetwork.

19. The method at a first node according to claim 16, wherein the step of receiving a multicast verification message includes receiving a multicast verification message on a first multicast channel and wherein the step of receiving a master list from the subnetwork leader includes receiving the master list on a second multicast channel.

20. A system for determining the availability of at least one node in a communications network with one or more subnetworks wherein each subnetwork comprises at least one node coupled thereto and a node identified as a subnetwork leader, and the communications network comprises one node identified as a network leader, the system comprising:

a multicast transmitter on at least one node in the one or more subnetworks for periodically multicasting on a subnetwork, a verification message from at least one node coupled on the subnetwork;

a subnetwork list of nodes that have sent the verification message assembled by on the subnetwork leader for a group of one or more subnetworks, an Internet protocol multicast transceiver on at least one subnetwork leader for transferring the subnetwork list from the subnetwork leader for the group of one or more subnetworks to the network leader node;

a master list comprising at least one subnetwork list of nodes that have sent the verification message assembled by the network leader; and an Internet protocol transceiver on the network leader for transferring the master list from the network leader to the subnetwork leader for the group of one or more subnetworks.

21. The system according to claim 20, further comprising:

a multicast transceiver for multicasting from the subnetwork leader for the group of one or more subnetworks the master list.

22. The system according to claim 20, further comprising:
means for selecting a subnetwork leader on at least one subnetwork from the at least one node coupled thereto.

23. The system according to claim 20, wherein the multicast transmitter transmits on a first multicast channel and the Internet protocol transceiver transmits on a second multicast channel.

24. A first node for determining the availability of at least one node in a communications network with one or more subnetworks comprising:
a first node coupled to a subnetwork in a communications network containing at least one subnetwork with one or more nodes coupled thereto;
means for determining if any subnetwork leader node is identified in the subnetwork, and if there is no subnetwork leader node identified, then identifying the first node as a subnetwork leader node; and
a multicast transceiver for periodically multicasting on the subnetwork, a verification message for reception by the subnetwork leader; and
a master list sent from the subnetwork leader in the subnetwork of the communications network, the master list contains an assembly of a subnetwork list from the group of one or more subnetworks, each subnetwork list containing a list of the verification message received by a subnetwork leader from each node coupled to the subnetwork, the master list assembled by a network leader of the group of one or more subnetworks that have sent the subnetwork list to the network leader node, and the master list sent from the network leader to subnetwork leader for the group of one or more subnetworks.

25. The first node according to claim 24, further comprising the step of:
means for determining if any network leader node is identified in the communications network, and if there is no network leader node identified, then identifying the first node as a network leader node.

26. The first node according to claim 24, wherein the master list received from the subnetwork leader is received via multicast.

27. The first node according to claim 24, wherein the master list received from the subnetwork leader includes receiving a master list from the subnetwork leader in the subnetwork of the communications network, the master list contains an assembly of a subnetwork list from the group of one or more subnetworks, each subnetwork list containing a list of the verification message received by a subnetwork leader from each node coupled to the subnetwork, the master list assembled by a network leader of the group of one or more subnetworks that have sent the subnetwork list to the network leader node, and the master list sent from the network leader via multicast protocol to the subnetwork leader for the group of one or more subnetworks.

28. The first node according to claim 24, wherein the master list received from the subnetwork leader includes receiving a master list from the subnetwork leader in the subnetwork of the communications network, the master list contains an assembly of a subnetwork list from the group of one or more subnetworks, each subnetwork list containing a list of the verification message received by the subnetwork leader from each node coupled to the subnetwork, the master list assembled by a network leader of the group of one or more subnetworks that have sent via multicast protocol the subnetwork list to the network leader node, and the master list sent from the network leader to the subnetwork leader for the group of one or more subnetworks.

29. The node according to claim 24, wherein the multicast transmitter periodically multicast a verification message on a first multicast channel and wherein the master list sent from the subnetwork leader is sent on a second multicast channel.

30. A subnetwork leader on a subnetwork for determining the availability of at least one node in a communications network with one or more subnetworks wherein each subnetwork comprises at least one node coupled thereto and a node identified as a subnetwork leader, and the communications network comprises one node identified as a network leader, comprising:
multicast transceiver for receiving a multicast verification message on the subnetwork from at least one node coupled on the subnetwork;
a subnetwork list of nodes that have sent the verification message;
a transceiver for transferring the subnetwork list from the subnetwork leader to the network leader node and for receiving from the network leader a master list assembled comprising at least one subnetwork list of nodes that have sent the verification message.

31. The subnetwork leader according to claim 30, further comprising:
a multicasting transceiver for multicasting the master list on the subnetwork.

32. The subnetwork leader according to claim 30, wherein verification message contains the status from least one node coupled on the subnetwork.

33. The subnetwork leader according to claim 30, wherein the multicast transmitter receives a multicast message on a first multicast channel and wherein the transceiver for transferring the subnetwork list includes transferring the subnetwork list on a second multicast channel.

34. A computer program product comprising a computer readable medium having computer readable program code therein for determining the availability of at least one node in a communications network with one or more subnetworks wherein each subnetwork comprises at least one node coupled thereto and a node identified as a subnetwork leader, and the communications network comprises one node identified as a network leader, said computer readable program code in said computer program product comprising:
computer readable program code for periodically multicasting on a subnetwork, a verification message from at least one node coupled on the subnetwork;
computer readable program code for building on the subnetwork leader for a group of one or more subnetworks, a subnetwork list of nodes that have sent a verification message;
computer readable program code for transferring the subnetwork list from the subnetwork leader for the group of one or more subnetworks to the network leader node;
computer readable program code for assembling on the network leader, a master list comprising at least one subnetwork list of nodes that have sent a verification message; and
computer readable program code for transferring the master list from the network leader to the subnetwork leader for the group of one or more subnetworks.

* * * * *

UNITED STATES PATENT AND TRADEMARK OFFICE
CERTIFICATE OF CORRECTION

PATENT NO. : 6,735,200 B1
DATED : May 11, 2004
INVENTOR(S) : Marcos Novaes

It is certified that error appears in the above-identified patent and that said Letters Patent is hereby corrected as shown below:

Column 11,
Lines 44-49, change "If YES, then the tunneling thread is stopped in step 726 and a decision is made in step 728 whether or not the message received is from a higher IP addresss. If YES, then in step 726 the node reverts back and becomes a beacon node. If NO, then in step 728 master list 502 message is transmitted along the subnetwork for which the SL is coupled." to -- If YES, a decision is made in step 728 whether or not the message received is from a higher IP address. If YES, then the tunneling thread is stopped in step 726. Then in step 728 the node reverts back and becomes a beacon node. If NO, then in step 730 mast list 502 messages is transmitted along the subnetwork for which the SL is coupled. --

Column 11,
Line 56, change "node." to -- nodes. --
Line 62, change "SL It" to -- SL --

Column 12,
Line 1, change "(3)" to -- 2. --
Line 2, change "anstabilization" to -- a stabilization --

Column 13,
Line 4, change "414, 424 and 434" to -- 412, 422 and 432 --
Line 12, change "result" to -- a result --
Line 59, change "NL" to -- SL --
Line 61, change "reduces dramatically" to -- dramatically reduces --

Column 14,
Line 5, change "is" to -- are --
Line 45, change "is" to -- it's --
Line 46, change "as re result" to -- as result --
Line 53, change "isolation" to -- isolating --

Column 15,
Line 51, change "the." to -- the --
Line 58, change "anotheraspect" to -- another aspect --

UNITED STATES PATENT AND TRADEMARK OFFICE
CERTIFICATE OF CORRECTION

PATENT NO. : 6,735,200 B1
DATED : May 11, 2004
INVENTOR(S) : Marcos Novaes

It is certified that error appears in the above-identified patent and that said Letters Patent is hereby corrected as shown below:

Column 16,
Line 22, change "(4)" to -- (1) --
Line 25, change "(5)" to -- (2) --
Line 27, change "(6)" to -- (3) --
Line 32, change "(7)" to -- (4) --
Line 42, change "(8)" to -- (5) --
Line 45, change "illustrate" to -- illustrated --

Column 17,
Line 14, change "connection are form" to -- connections are from --
Line 45, change "off" to -- of --
Line 49, change "address" to -- addresses --

Column 22,
Line 4, change "multicast" to -- multicasts --
Line 30, change "from least" to -- from at least --

Signed and Sealed this

Third Day of August, 2004

JON W. DUDAS
*Acting Director of the United States Patent and Trademark Office*